United States Patent [19]

Blackburn

[11] Patent Number: 4,687,165
[45] Date of Patent: Aug. 18, 1987

[54] ADAPTER PLATE ASSEMBLY FOR ADJUSTABLE MOUNTING OF OBJECTS

[75] Inventor: Robert S. Blackburn, Albuquerque, N. Mex.

[73] Assignee: The United States of America as represented by the United States Department of Energy, Washington, D.C.

[21] Appl. No.: 859,167
[22] Filed: May 2, 1986
[51] Int. Cl.$^4$ ............................................... E04G 3/00
[52] U.S. Cl. ..................................... 248/274; 248/178; 248/476
[58] Field of Search ............... 248/184, 180, 274, 476, 248/466, 178, 346; 350/245, 251, 253, 254, 255, 257; 269/66, 293, 311

[56] References Cited

U.S. PATENT DOCUMENTS

| 3,596,444 | 6/1986 | Ushida | 350/247 |
| 3,652,152 | 3/1972 | Thursby | 350/245 X |
| 3,692,268 | 9/1972 | Laughlin | 269/66 X |
| 4,077,722 | 3/1978 | Bicskei | 350/247 X |
| 4,114,848 | 9/1978 | Bernard | 248/346 |
| 4,120,586 | 10/1978 | Lessner | 248/466 X |
| 4,408,830 | 10/1983 | Wutherich | 350/247 |
| 4,492,356 | 1/1985 | Taniguchi | 248/346 |
| 4,522,365 | 6/1985 | Tabares | 248/466 |

OTHER PUBLICATIONS

"IBM Technical Disclosure Bulletin"; published Sep. 1977; L. Adams, Jr.

Primary Examiner—J. Franklin Foss
Attorney, Agent, or Firm—James H. Chafin; Judson R. Hightower

[57] ABSTRACT

An adapter plate and two locking discs are together affixed to an optic table with machine screws or bolts threaded into a fixed array of internally threaded holes provided in the table surface. The adapter plate preferably has two, and preferably parallel, elongated locating slots each freely receiving a portion of one of the locking discs for secure affixation of the adapter plate to the optic table. A plurality of threaded apertures provided in the adapter plate are available to attach optical mounts or other devices onto the adapter plate in an orientation not limited by the disposition of the array of threaded holes in the table surface. An axially aligned but radially offset hole through each locking disc receives a screw that tightens onto the table, such that prior to tightening of the screw the locking disc may rotate and translate within each locating slot of the adapter plate for maximum flexibility of the orientation thereof.

8 Claims, 4 Drawing Figures

ADAPTER PLATE ASSEMBLY FOR ADJUSTABLE MOUNTING OF OBJECTS

The U.S. Government has rights in this invention pursuant to Contract No. DE-AC04-76DP00789 between the U.S. Department of Energy and AT&T Technologies, Inc.

BACKGROUND OF THE INVENTION

1. Field of the Invention

This invention relates generally to an apparatus which permits adjustably oriented mounting of an object or a piece of equipment to a mounting surface provided with an array of mounting apertures which allow the equipment to be mounted only in certain positions, and more particularly to an adapter plate assembly suitable for mounting optical or laser devices to optical tables with regularly-spaced mounting holes.

2. History of the Prior Art

Commercially available elements or items of equipment that have to be used with other similar components are often available with mounting portions provided with one or more holes or slots through which screws or bolts are passed to affix the item securely to a mounting surface. Because there is no universal standardization about the manner and disposition of such holes or slots, it is often the case that a given mounting surface also provided with a regular array of holes does not match individual items of equipment exactly. The result often is that such items of equipment may not be mounted securely in the precise location and with the precise orientation that is most advantageous for their use. A relatively compact adapter, capable of allowing such equipment to be mounted securely to a supporting surface, in any position and oriented in any direction, is therefore highly desirable.

Examples of known solutions to the above-identified problem include U.S. Pat. No. 4,114,848, which teaches the use of perforated mounted plates, each provided with a plurality of similar rectangular holes defining cross members between neighboring holes such that the spacing between holes is the smallest value satisfying very specific requirements relating to the center-to-center distances between holes in the devices to be mounted thereon and the diameters of the screws used to do so. U.S. Pat. No. 3,503,377, discloses a mounting frame with pairs of parallel elongated slots to which are attached sliding bars which have elongated slots generally orthogonal to the frame slots. Thus, two sliding bars are moved around until their slots become congruent with holes in the equipment after which the sliding bars are bolted tight to affix the equipment to the mounting surface. U.S. Pat. No. 4,522,365 discloses a dual-access positioning apparatus comprised of a base plate member, two planar adjustment members mounted one atop another, and connecting sections which couple the three planar members together by pairs at oppositely disclosed corner portions, generally disposed at 90° with respect to each other.

The teachings of the three patents discussed above typify the complexities and general limitations of such systems. There is, therefore, a clear need for a very simple adapter assembly that permits any item of equipment mounted thereon to be securely, quickly and precisely oriented, with the freedom for minor adjustments to the orientation of the device to be effected easily.

SUMMARY OF THE INVENTION

Accordingly, it is an objective of this invention to provide a simple adapter assembly which permits the mounting thereon of an object, whose orientation with respect to a mounting surface also attached to the adapter assembly is infinitely variable and secure.

This objective of the invention is achieved by providing, in combination, an adapter member with a base having a first surface for contacting a mounting surface provided with a plurality of affixation apertures, the adapter member having preferably two elongated locating slot apertures in its base portion each having a length longer than its width. A locking member, having a first cylindrical portion of a diameter small enough to be accommodated within the width of a locating slot in the adapter member and a second portion having a dimension larger than the width of the same slot, is positioned with its cylindrical portion within the slot and the larger portion thereabove to clamp the adapter member to the mounting surface by means of a screw or bolt passing through an aperture offset from the axis of the cylindrical portion of the locking member. The axis of the cylindrical portion of the locking member is thus offset with respect to the screw, hence rotation of the locking member about the screw permits changes in the orientation of the slot or slots of the adapter member with respect to the mounting surface and provides the desired infinitely variable orientation of the mounted object prior to tightening of the screw for secure affixation of the object, through the adapter member, to the mounting surface.

According to another aspect of this invention, the adapter member has an essentially flat form and the locking member is comprised of two coaxial cylindrical portions of different diameters, with the adapter member being provided with a plurality of internally threaded apertures for mounting objects thereto, distributed between a pair of locating slot apertures affixable by locking members to a mounting surface.

DESCRIPTION OF THE DRAWINGS

Other and further advantageous features of the present invention will hereinafter more fully appear in connection with a detailed description of the drawings, in which.

DESCRIPTION OF THE PREFERRED EMBODIMENT

Figure 1:
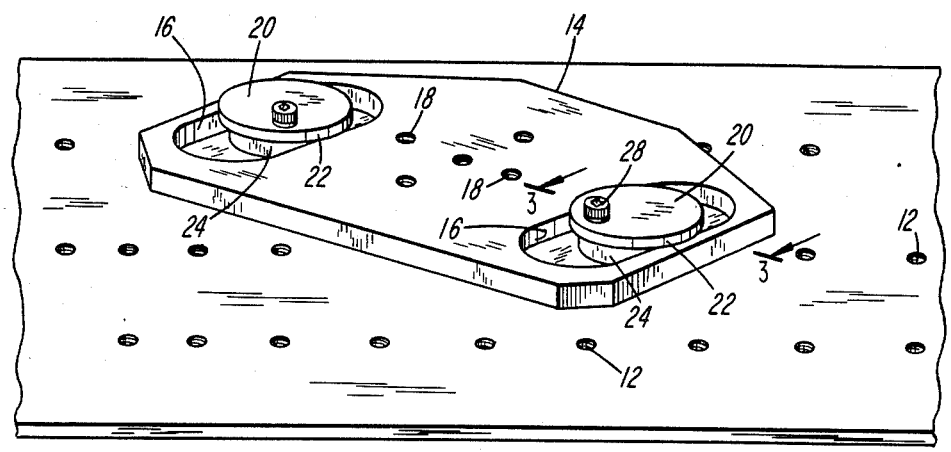
FIG. 1 is a perspective drawing showing the adapter plate assembly of this invention, in a preferred embodiment, mounted to a mounting surface.

Referring to FIG. 1, a preferred embodiment of the apparatus of this invention comprises an adapter plate 14 provided with a plurality of apertures 18, and two larger locating slots 16 each of which freely receives a generally cylindrical portion 24 of a locking disc 20.

As will become clear from a complete understanding of this disclosure, with reference to FIGS. 1-4 hereof, an adapter member can have almost any form so long as it also has an essentially flat base portion in the region of locating slots 16. More than one object, of varying size and shape, can be mounted on a single adapter member, whether or not the adapter member is itself shaped like adapter plate 14 or is more elaborately shaped in part to suit specific needs. Likewise, as persons skilled in the art will readily appreciate, the so-called locking disc 20 is only one convenient form of the requisite locking member, which needs to have a portion 24 (preferably cylindrical) small enough to be freely received within a locating slot 16 and may have its layer-dimensional portion 22 non-cylindrical.

Adapter plate 14 is placed on a supporting plate-like surface 10 provided with a preferably regular array of attaching apertures 12. Each locking disc 20 has a generally cylindrical upper flange-like portion 22 with a diameter greater than the width of locating slots 16 of adapter plate 14, and is affixed to the supporting element 10, e.g., the top of a standard optic table, by means of screws or bolts 28.

Figure 2:
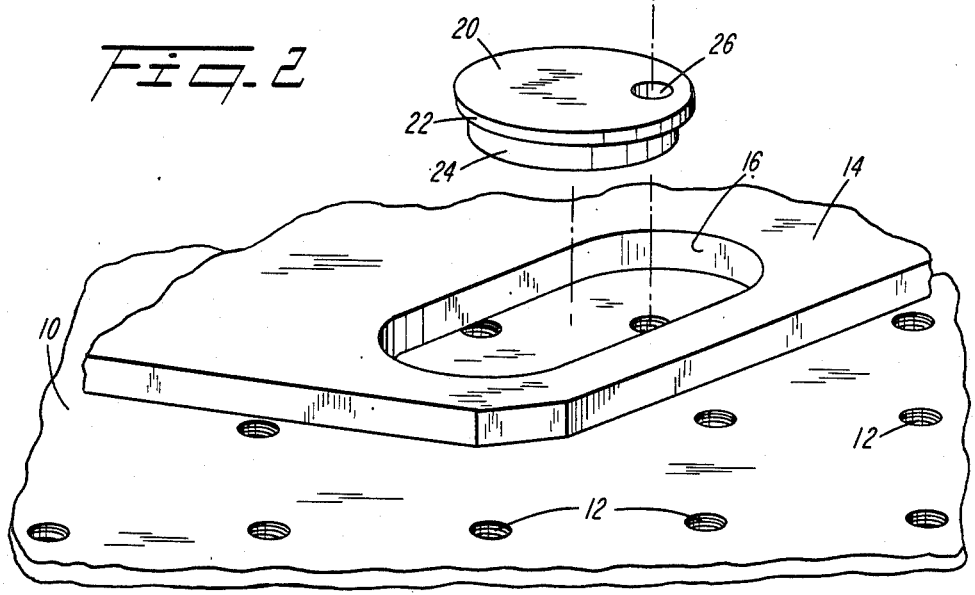
FIG. 2 is an exploded view of a portion of the adapter plate assembly and mounting surface of FIG. 1.

As best seen in FIG. 2, each locking disc 20 is provided with an aperture 26 oriented parallel to the locking disc axis but offset at a small radial distance "r" therefrom. Aperture 26 is large enough to allow free passage of the stem of screw 28, of which a threaded portion 30 is engagable with internally threaded apertures 12. Screw 28 is advantageously used with a spring washer 32.

Figure 3:
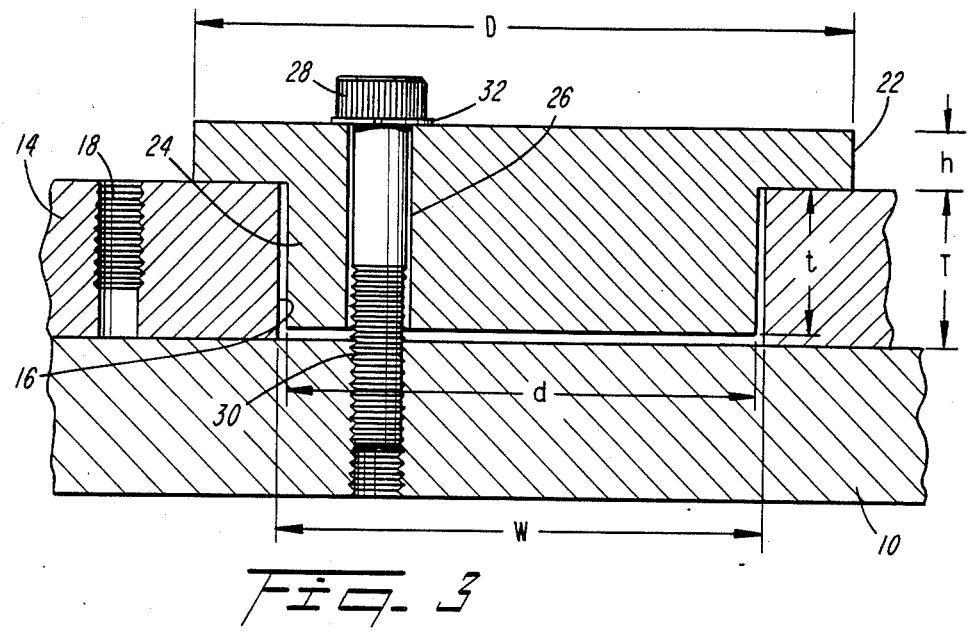
FIG. 3 is a partial vertical cross-section at section 3—3 of FIG. 1.
Figure 4:
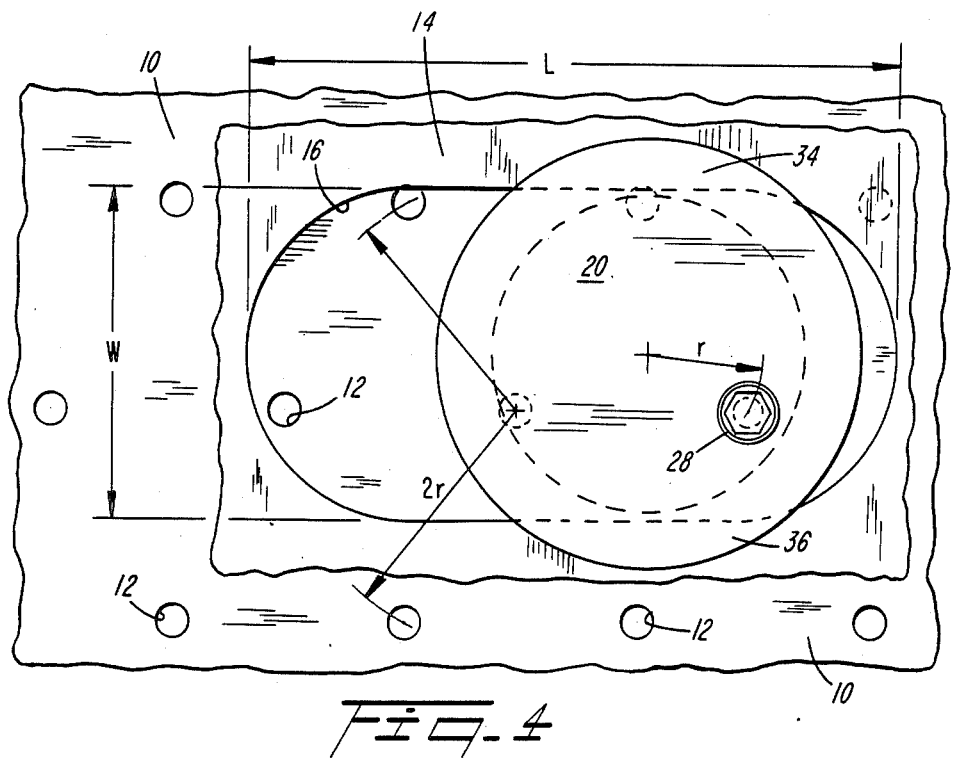
FIG. 4 is a plan view of a portion of the adapter plate assembly of FIG. 1, to show dimensional details thereof.

Certain important dimensional relationships are best understood with reference to FIGS. 3 and 4, in which it is seen that the width "W" of a locating slot 16 is slightly larger than the diameter "d" of portion 24 a locking disc 20, and the height "t" of portion 24 of a locking disc 20 is less than the thickness "T" of adapter plate 14. Diameter "D" of the upper portion 22 of a locking disc 20 is substantially larger than the width "W" of locating slot 16, so that when screw 28 is employed to tighten locating disc 20 overlapping portions 34 and 36 of locking disc 20 (shown shaded in FIG. 4) will contact and press down firmly to hold adapter plate 14 to table 10. As persons skilled in the art will appreciate, the thickness "h" of the upper portion 22 of locking disc 20 should be sufficient to ensure the mechanical integrity of locking disc 20 during repeated tightening of retaining screws 28, i.e., depending on the material used there should be no significant permanent deformation in prolonged use.

The overall length "L" of locating slot 16 should preferably be at least twice as long as diameter "d" of portion 24 thereof. Also the radius "r" locating the axis of aperture 28 in a locking disc 16 with respect to the axis thereof should preferably be as least half the distance between the closest adjacent apertures 12 in table 10.

The plurality of apertures 18 in adapter plate 14 are intended to permit the bolting onto adapter plate 14 of pieces of optical or other equipment. These apertures 18 are therefore conveniently provided with internal threads as best seen in FIG. 3. However, in order to avoid the exertion of conflicting forces by elongated threaded screws (not shown) entering apertures 18 and acting forcibly on surface 10, it is preferable that the threading inside apertures 18 not be permitted to extend through the thickness of plate 14, as best seen with reference to FIG. 3. Thus, when equipment is mounted on adapter plate 14 by means of screws entering threaded apertures 18, the penetration of such screws (not shown) is limited to the threaded portions of apertures 18 of adapter plate 14. As persons skilled in the art will appreciate, in principle, even a single locating slot 16 with a locating disc 20 received therein may suffice to achieve the intended purpose of this invention, i.e., to permit the placement of adapter plate 16 in an orientation independent of the array of apertures 12 in table 10. However, for added security of attachment of the adapter plate 16 to table 10, at least two, preferably parallel, locating slots 16 are recommended. Locating slots 16 and locking disc 20 are designed to function cooperatively so as to align the aperture 26 in each locking disc 20 with an aperture 12 of table 10. Once this alignment is obtained, and an attaching screw 28 passed therethrough and threaded to the optic table 10, each disc becomes a clamp that can be tightened to securely affix adapter plate 14 to table 10.

Initially, the adapter plate 14 is placed on the table 10 in any desired position, i.e., not necessarily aligned with the array of apertures 12 in table top 10, as best seen with reference to FIG. 4. Each locating slot in the adapter plate 14 then defines an area within which one or more of apertures 12 of optical table 10 will be visible. A locking disc 20 is then placed in each locating slot and a screw 28 passed through offset aperture 26 and locking disc 20 is then rotated about screw 28, with locking disc 20 rotating and sliding within locating slot 16 as necessary, until precise location of adapter plate 14 and any equipment mounted thereon is obtained. This combined rotating and translating motion of locking disc 20 with respect to slot 16 allows very precise adjustment of the orientation of any equipment mounted on adapter plate 14 regardless of the disposition of the array of apertures 12 in table top 10. Upon tightening of screw 28, a locking force is exerted by portion 22 of the locking disc 20 on adapter plate 14 to affix it to table 10. As described above, adapter plate 14 can be oriented with respect to optic table 10 in any longitudinal, lateral, or angular relationship with the array of apertures 12 in optic table 10. This feature allows the installation of an optic mount wherever needed and in any position required, and allows for adjustment thereof without total disengagement of the equipment mounted on the adapter plate 24 from the supporting table surface 12. Likewise, if it is necessary to remove any equipment for calibration or repair, it may be returned to a predetermined positon of the locked-in-place adapter plate 14 without any extensive effort being required for realignment of the equipment. As persons skilled in the art will appreciate, a user may mount a stand, post, or bracket onto adapter plate 14 by means of threaded apertures 18 and use such post or bracket to attach equipment at varying heights or at varying angles with respect to the vertical. For example, when a laser beam reflector is installed, the reflector typically must be positioned in a specific and very precise relationship to a transmitting and to a receiving optic element, respectively. To meet these demanding positioning needs, an adjustable interfacing device may be mounted on adapter plate 14 to allow the required precise alignment. The adapter plate of this invention readily facilitates such precision with flexibility and security.

It should be apparent from the preceding that this invention may be practiced otherwise than as specifically described and disclosed herein. Modifications, therefore, may be made to the specific embodiment disclosed herein without departing from the scope of this invention and are intended to be included within the claims appended below.

I claim:

1. An object mounting adapter assembly, for securely mounting an object in readily rejustable precise orientation with respect to a mounting surface containing an array of affixation apertures, comprising:

an adapter member, formed to have a base portion having a first surface shaped to contactingly match said mounting surface, said base portion being provided with at least one slot aperture having a length longer than its width, and said adapter member having an object holding portion to securely hold said object mounted thereat;

a generally cylindrical locking member, having a first cylindrical portion with a diameter slightly smaller than said width of said slot aperture and a length smaller than the thickness of said base portion around said slot for freely translating along and rotating within said slot aperture during use; said locking member having a second portion having a dimension, normal to the diameter of the axis of said first cylindrical portion, larger than said width of said slot aperture; and said locking member also having a through aperture offset from and parallel to said axis of said first cylindrical portion thereof; and connecting means, passing through said aperture in said locking member and at least one of said affixation apertures of said mounting surface, for connecting said adapter member to said mounting surface with said adapter member clamps between said mounting surface and said second portion of said locking member.

2. An adapter plate assembly, for securely mounting objects in readily adjustable precise orientation with respect to a mounting surface containing an array of apertures, comprising:

an adapter plate of thickness "T", formed to have a first surface shaped to contactingly match said mounting surface, provided with at least one locating slot aperture having a length "L" longer than a width "W", and further provided with at least one object mounting aperture;

a generally cylindrical locking disc, having a first cylindrical portion thereof of a first diameter "d" slightly smaller than said width "W" and a first length "t" smaller than said thickness "T" of said adapter plate, said locking disc having a second coaxially cylindrical portion of a second length "h" and a second diameter "D" larger than said width "W", said locking disc also having a lengthwise-oriented aperture located entirely within said first and second cylindrical portions and with its center offset a radial distance "r" from the common axis of said first and second cylindrical portions; and connecting means, passing through said aperture in said locking disc, for connecting said locking disc to said mounting surface with said adapter disc clamped therebetween such that said first cylindrical portion of said locking disc is received within said locating slot of said adapter plate.

3. An adapter plate assembly according to claim 2, wherein:

said adapter plate contains two of said locating slot apertures oriented parallel to each other, with at least one of said object mounting apertures being located therebetween.

4. An adapter plate assembly according to claim 2, wherein:

said first surface of said adapter plate and said mounting surface are flat.

5. An adapter plate assembly according to claim 2, wherein:

a plurality of said object mounting apertures are distributed in said adapter plate and are provided with internal threads along a portion of their respective lengths.

6. An adapter plate assembly according to claim 2, wherein:

said first surface of said adapter plate and said mounting surface are flat; and said adapter plate contains two of said locating slot apertures oriented parallel to each other, and also contains a plurality of said object mounting apertures each with internal threads along a portion of its length.

7. An adapter plate assembly according to claim 2, wherein:

said radial distance "r" is not less than half the largest separation between the centers of immediately adjacent apertures in said mounting surface.

8. An adapter plate assembly according to claim 2, wherein:

said length "L" of said locating slot is not less than twice the width "W" thereof.

* * * * *